United States Patent
Wu et al.

(10) Patent No.: US 9,958,915 B1
(45) Date of Patent: May 1, 2018

(54) SLOT ASSEMBLY

(71) Applicant: ELITEGROUP COMPUTER SYSTEMS CO., LTD., Taipei (TW)

(72) Inventors: Jiun-Kai Wu, Taipei (TW); Chi-Ming Chung, Taipei (TW); Yu-Tang Zeng, Taipei (TW)

(73) Assignee: ELITEGROUP COMPUTER SYSTEMS CO., LTD., Taipei (TW)

( * ) Notice: Subject to any disclaimer, the term of this patent is extended or adjusted under 35 U.S.C. 154(b) by 0 days. days.

(21) Appl. No.: 15/427,483

(22) Filed: Feb. 8, 2017

(30) Foreign Application Priority Data

Dec. 14, 2016 (TW) .............................. 105219070 U

(51) Int. Cl.
  *G06F 1/20* (2006.01)
  *G06F 1/18* (2006.01)
(52) U.S. Cl.
  CPC ................ *G06F 1/20* (2013.01); *G06F 1/185* (2013.01)
(58) Field of Classification Search
  CPC ............ G06F 1/185; G06F 1/187; G06F 1/20; H05K 5/0265; H05K 5/0269; H05K 5/0282; H05K 5/0286; H05K 5/0295; H05K 7/1461; H05K 7/20154; H05K 1/144
  USPC ... 361/679.37–39, 679.41, 679.54, 704, 711, 361/727
  See application file for complete search history.

(56) References Cited

U.S. PATENT DOCUMENTS

| | | | |
|---|---|---|---|
| 8,472,204 B2 * | 6/2013 | Leibowitz | G06F 1/186 361/736 |
| 8,760,870 B2 * | 6/2014 | Yamamoto | G02B 6/4201 165/80.2 |
| 8,837,152 B2 * | 9/2014 | Chen | G11B 33/124 165/80.3 |
| 2012/0127665 A1 * | 5/2012 | Prete | G06F 1/20 361/704 |

* cited by examiner

*Primary Examiner* — Mukund G Patel
(74) *Attorney, Agent, or Firm* — Maschoff Brennan

(57) ABSTRACT

A slot assembly configured for being inserted by a workpiece. The slot assembly comprises a holder body, a substrate, a push member and a heat spreader. The substrate and the holder body together form an accommodating space therebetween. The push member is movable between a released position and a pressed position. The push member is configured for being moved from the released position to the pressed position by being pushed by the workpiece. The heat spreader is movably disposed on the substrate and located in the accommodating space. The heat spreader has a thermal contact surface facing away from the substrate. The thermal contact surface is configured for being in thermal contact with the workpiece. When the push member is located at the pressed position, the heat spreader is located at a thermal contact position where the thermal contact surface is in thermal contact with the workpiece.

10 Claims, 21 Drawing Sheets

SLOT ASSEMBLY

CROSS-REFERENCE TO RELATED APPLICATIONS

This non-provisional application claims priority under 35 U.S.C. § 119(a) on Patent Application No(s). 105219070 filed in Taiwan, R.O.C. on Dec. 14, 2016, the entire contents of which are hereby incorporated by reference.

TECHNICAL FIELD

The disclosure relates to a slot assembly, more particularly a slot assembly having a heat spreader.

BACKGROUND

In recent years, the developments of various electronic devices make our lives become more convenient, and people have more and more diverse requirements on the electronic devices. Accordingly, manufacturers start to use the same electronic devices by adding expansion cards each having a specific function in order to meet the said diverse requirements on the electrical devices. In that case, users can insert expansion cards into an electronic device so as to provide expanded capability to the electronic device.

However, when an electronic device inserted with an expansion card is in operation, the expansion card might generate heat because of the current flowing through.

SUMMARY

One embodiment of the disclosure provides a slot assembly configured for being inserted by a workpiece. The slot assembly comprises a holder body, a substrate, a push member and a heat spreader. The holder body is disposed on the substrate. The substrate and the holder body together form an accommodating space therebetween. The accommodating space has an open end. The workpiece is configured for being inserted into or removed from the accommodating space through the open end. The push member is movably disposed on the substrate and located in the accommodating space. The push member is movable between a released position and a pressed position. When the push member is at the released position, the push member is relatively close to the open end relative to the substrate. When the push member is at the pressed position, the push member is relatively away from the open end relative to the substrate. The push member is configured for being moved from the released position to the pressed position by being pushed by the workpiece. The heat spreader is movably disposed on the substrate and located in the accommodating space. The heat spreader has a thermal contact surface facing away from the substrate. The thermal contact surface is configured for being in thermal contact with the workpiece. The push member is disposed on the heat spreader. When the push member is located at the released position, the heat spreader is located at an offset position where the thermal contact surface is relatively close to the substrate. When the push member is located at the pressed position, the heat spreader is located at a thermal contact position where the thermal contact surface is relatively away from the substrate and is in thermal contact with the workpiece.

BRIEF DESCRIPTION OF THE DRAWINGS

The present disclosure will become more fully understood from the detailed description given hereinbelow and the accompanying drawings which are given by way of illustration only and thus are not intending to limit the present disclosure and wherein.

DETAILED DESCRIPTION

Figure 1:
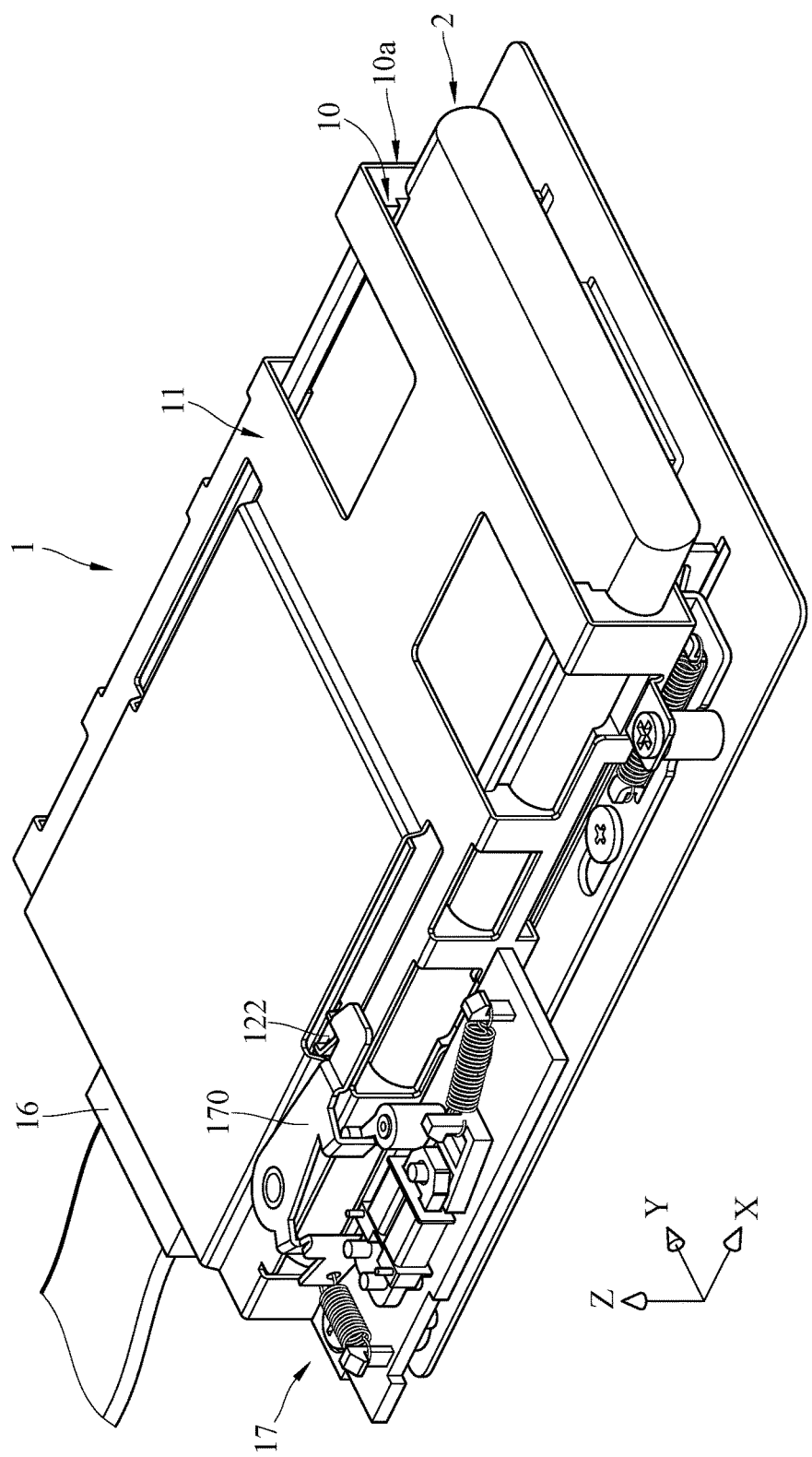
FIG. 1 is a perspective view of a slot assembly and a workpiece in accordance with one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Please refer to FIG. 1 to FIG. 4. A slot assembly 1 is disposed in an electronic device and is configured for being inserted by a workpiece 2. The workpiece 2 is, for example, a graphics card, a memory card, an I/O card or other types of expansion cards. In this embodiment, the slot assembly 1 includes a holder body 11, a tray 12, a substrate 13, two elastic members 14, two elastic members 15, a connection port 16, a switch assembly 17, a heat spreader 18, four elastic members 18a, two push members 182 and two guide structures 19. However, two of the four elastic members 18a are not shown in the drawings because they are covered by the heat spreader 18, so the other two, which are not covered by the heat spreader 18, are used for illustration.

Either the holder body 11 or the substrate 13 is disposed on a housing of the electronic device. The holder body 11 is disposed on the substrate 13. The holder body 11 and the substrate 13 together form an accommodating space 10 therebetween. The accommodating space 10 has an open end 10a, and the workpiece 2 is inserted into or removed from the accommodating space 10 through the open end 10a. The connection port 16 is disposed on holder body 11, the substrate 13 or the housing of the electronic device. When the workpiece 2 is inserted into the accommodating space 10, the connection port 16 is configured to be electrically connected to the workpiece 2.

The tray 12 is slidably disposed on the holder body 11 and is located in the accommodating space 10. The tray 12 has a first engaging portion 122. The elastic members 14 are connected to the holder body 11 and the tray 12. The tray 12 is movable between a removed position and an inserted position. When the tray 12 is at the removed position, the tray is relatively close to the open end 10a relative to the holder body 11; when the tray 12 is at the inserted position, the tray 12 is relatively away from the open end 10a relative to the holder body 11. In addition, the tray 12 is at a transition position when the tray 12 is located between the removed position and the inserted position. The tray 12 is pushed by the workpiece 2 to move from the removed position through the transition position to the inserted position. The elastic members 14 constantly force the tray 12 toward the removed position. In this embodiment, the elastic members 14 are springs, but the present disclosure is not limit thereto. In some embodiments, the elastic members may be other kinds of resilient objects according to requirements.

The switch assembly 17 is disposed on the holder body 11. The switch assembly 17 includes a second engaging portion 170, a first magnetic member 171, a second magnetic member 172, a first elastic member 173, a second elastic member 174 and a pivotal member 175. Moreover, the switch assembly 17 has a turn-on position and a turn-off position. The second engaging portion 170 is engaged to the first engaging portion 122 when the second engaging portion 170 is located at the turn-off position. The second engaging portion 170 is disengaged from the first engaging portion 122 when the second engaging portion 170 is located at the turn-on position.

Furthermore, the second engaging portion 170 and the pivotal member 175 are respectively pivoted to the holder body 11. One end of the first elastic member 173 is hooked to the holder body 11, and the other end of the first elastic member 173 is hooked to the second engaging portion 170. One end of the second elastic member 174 is hooked to the holder body 11, and the other end of the second elastic member 174 is hooked to the pivotal member 175. The second magnetic member 172 is pivoted to the pivotal member 175. The pivotal member 175 is able to press against the second engaging portion 170.

In this embodiment, the second elastic member 174 is able to drive the pivotal member 175 to rotate in a first rotation direction D1. When the pivotal member 175 is rotated in the first rotation direction D1, the second engaging portion 170 is pushed by the pivotal member 175 to rotate in a second rotation direction D2 which is different from the first rotation direction D1. Moreover, the first elastic member 173 is able to drive the second engaging portion 170 to rotate in the first rotation direction D1.

The heat spreader 18 is movably disposed on the substrate 13 and is located in the accommodating space 10. The heat spreader 18 is movable substantially along a direction (i.e. in the positive and negative Z directions in figures) perpendicular to a direction (i.e. in the positive and negative X directions in figures) where the workpiece 2 is inserted into and removed from the accommodating space 10, or movable substantially along a direction having a component pointing in the positive and negative Z directions. The heat spreader 18 is movable between an offset position and a thermal contact position. When the heat spreader 18 is at the offset position, the heat spreader 18 is relatively close to the substrate 13; when the heat spreader 18 is at the thermal contact position, the heat spreader 18 is relatively away from the substrate 13. The heat spreader 18 has a thermal contact surface 180 facing away from the substrate 13. The thermal contact surface 180 is configured for being in thermal contact with the workpiece 2. The elastic members 18a are disposed between the heat spreader 18 and the substrate 13. The elastic members 18a are configured to push the heat spreader 18 away from the substrate 13, and constantly force the heat spreader 18 toward the thermal contact position.

The heat spreader 18 has four guide elements 181 which are grooves. Each guide element 181 has a first end 181a close to the open end 10a and a second end 181b away from the open end 10a. A distance H1 between the first end 181a and the thermal contact surface 180 is less than a distance H2 between the second end 181b and the thermal contact surface 180. A width of the second end 181b is wider than a width of the first end 181a. Even though there are manufacturing tolerances in producing the slot assembly 1, the elastic members 18a are still able to drive the thermal contact surface 180 of the heat spreader 18 to move closer toward the workpiece 2 by the second end 181b.

The guide structures 19 are disposed on the substrate 13 and movable substantially along the surface of the substrate 13. The push members 182 are respectively fixed on the guide structures 19. The push members 182 are movably disposed on the substrate 13 through the guide structures 19. The push members 182 are located in the accommodating space 10. Each push member 182 is movable between a released position and a pressed position. When the push member 182 is at the released position, the push member 182 is relatively close to the open end 10a relative to the substrate 13; when the push member 182 is at the pressed position, the push member 182 is relatively away from the open end 10a relative to the substrate 13. When the tray 12 is at the transition position, the workpiece 2 is carried by the tray 12 but not in contact with the push members 182 yet. The push members 182 are able to be moved from the released position to the pressed position by being pushed by the workpiece 2. When the push members 182 are at the released position, the heat spreader 18 is at the offset position where the thermal contact surface 180 is relatively close to the substrate 13. When the push members 182 are at the pressed position, the heat spreader 18 is at the thermal contact position where the thermal contact surface 180 is relatively away from the substrate 13 and the heat spreader 18 is in thermal contact with the workpiece 2.

Each guide structure 19 has two through-holes 190. The screw bolts 131 pass through the through-holes 190 and are fixed to the substrate 13. Therefore, when the guide structures 19 are moved relative to the substrate 13, the screw bolts 131 and the through-holes 190 are moved relative to each other. One end of each elastic member 15 is disposed on the substrate 13, and the other end of each elastic member 15 is disposed on the guide structures 19. The elastic members 15 are disposed on the push members 182 through the guide structures 19. The elastic members 15 constantly force the push members 182 toward the released position.

Each guide structure 19 includes two guide blocks 191 which are movable substantially along the guide elements 181. The guide blocks 191 are respectively movably located in the guide elements 181. A distance H3 between each guide block 191 and substrate 13 substantially does not vary. When the heat spreader 18 is at the thermal contact position, there is a room between the guide elements 181 and the guide blocks 191 for the guide elements 181 and the guide blocks 191 to be slightly moved relative to each other in the positive and negative Z directions, such that a slight deviation due to manufacturing tolerances is allowed.

When the tray 12 is at the removed position or the transition position, the push members 182 are at the released position, and the heat spreader 18 is at the offset position. When the tray 12 is at the inserted position, the push members 182 are at the pressed position, and the heat spreader 18 is at the thermal contact position.

The quantity of the push members 182, the guide structures 19, the elastic members 14 or the elastic members 15 is not limited two, and it may be altered to be one or more than three in other embodiments. The quantity of the elastic members 18a is not limited, and it may be altered to be one or more than three in other embodiments.

Figure 2:
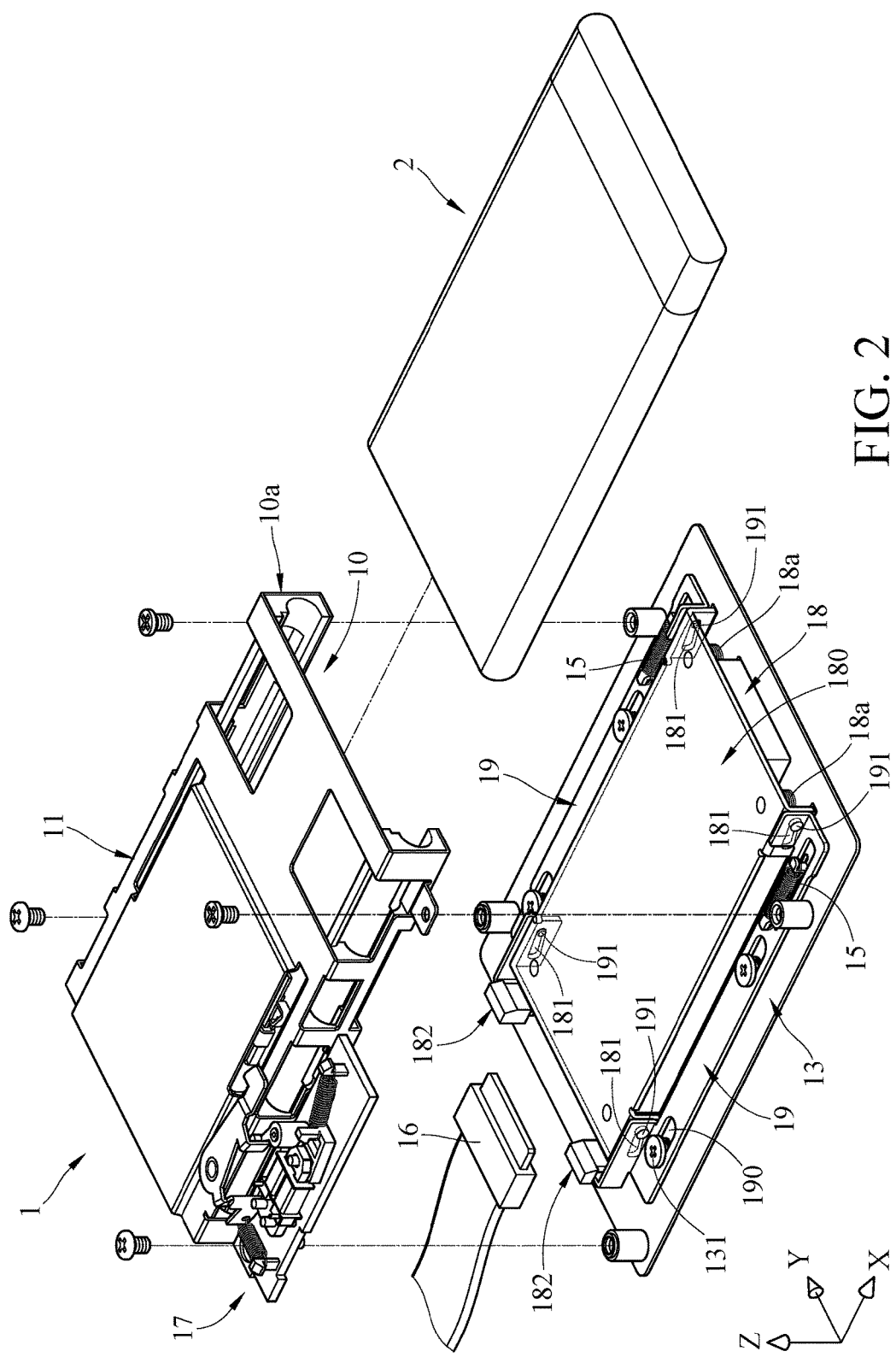
FIG. 2 is an exploded view of the slot assembly and the workpiece in FIG. 1.
Figure 3:
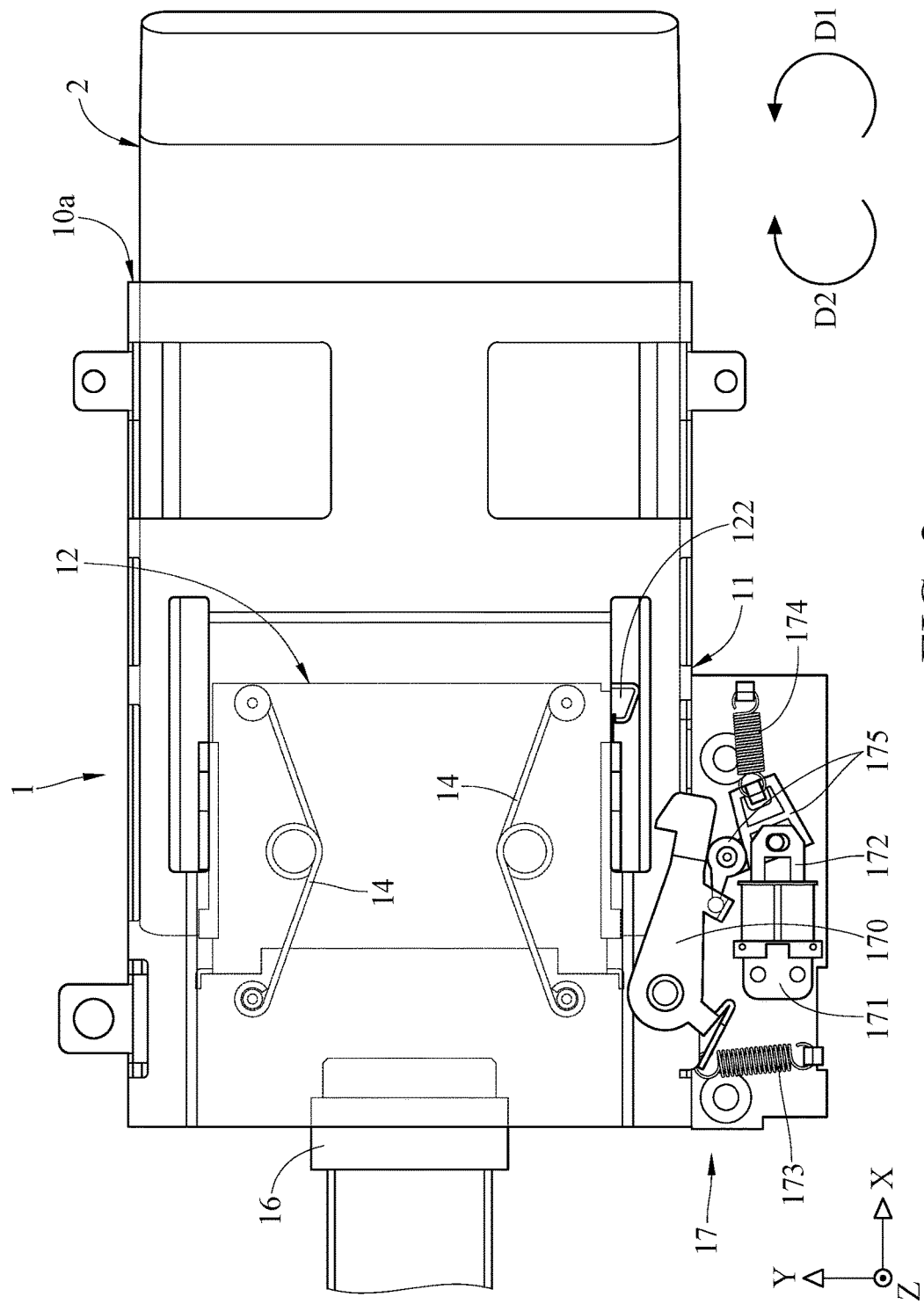
FIG. 3 is a top view of the slot assembly and the workpiece in FIG. 1 in one state.
Figure 4:
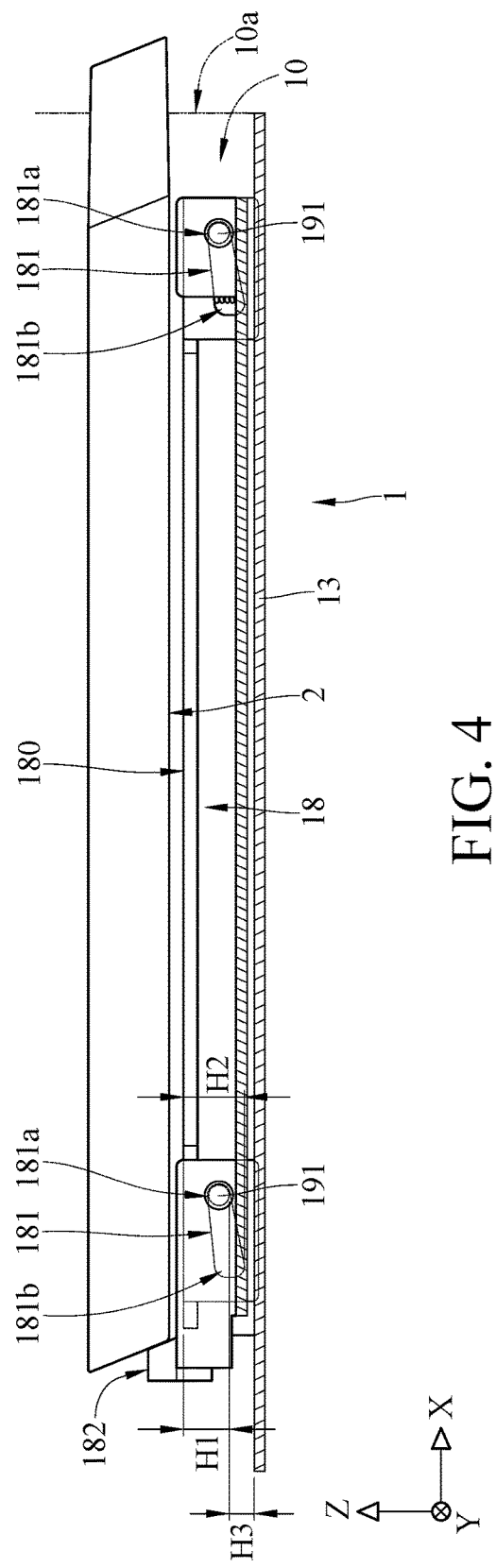
FIG. 4 is cross-sectional side view of the slot assembly and the workpiece in FIG. 1 in the one state.

As shown in FIG. 2, FIG. 3 and FIG. 4, when the workpiece 2 is being inserted into the accommodating space 10 but the workpiece 2 is not in contact with the tray 12 yet, the tray 12 is at the removed position, the push members 182 are at the released position, and the heat spreader 18 is at the offset position. The second engaging portion 170 of the switch assembly 17 is at the turn-off position.

In the mean time, the first magnetic member 171 and the second magnetic member 172 attract to each other. The magnetic force between the first magnetic member 171 and the second magnetic member 172 resists the elastic force of the second elastic member 174, so that the pivotal member 175 is not rotating. The first elastic member 173 drives the second engaging portion 170 to rotate in the first rotation direction D1 until the second engaging portion 170 presses against the pivotal member 175. At this moment, the second engaging portion 170 is at the turn-off position and engaged with the first engaging portion 122.

When the push members 182 are at the released position, the guide blocks 191 are at the first end 181a of the guide elements 181. The distance between the thermal contact surface 180 of the heat spreader 18 and the substrate 13 equals to the distance H1 between the thermal contact surface 180 and the first end 181a plus the distance H3 between the guide blocks 191 and the substrate 13. Since the distance H1 between the thermal contact surface 180 and the first end 181a is less than distance H2 between the thermal contact surface 180 and the second end 181b, the thermal contact surface 180 is relatively close to the substrate 13, so that the heat spreader 18 is at the offset position. At this moment, the workpiece 2 and the heat spreader 18 are not in contact with each other; that is, the workpiece 2 and the heat spreader 18 are not pressing or sliding against each other.

The workpiece 2 is kept being pushed into the accommodating space 10 and pressing the tray 12 to slide from the removed position toward the inserted position. In the mean time, the tray 12 is being moved through the transition position, but the workpiece 2 is not in contact with the push members 182 yet. At this moment, the push members 182 are at the released position, and the heat spreader 18 is at the offset position. The elastic members 14 connected to the tray 12 and the holder body 11 are pressed and deformed. Moreover, when the first engaging portion 122 of the tray 12 is in contact with the second engaging portion 170 of the switch assembly 17, the second engaging portion 170 is rotated toward the turn-on position in the second rotation direction D2 by being driven by the first engaging portion 122. At this moment, the second engaging portion 170 is not pressing against the pivotal member 175.

Figure 5:
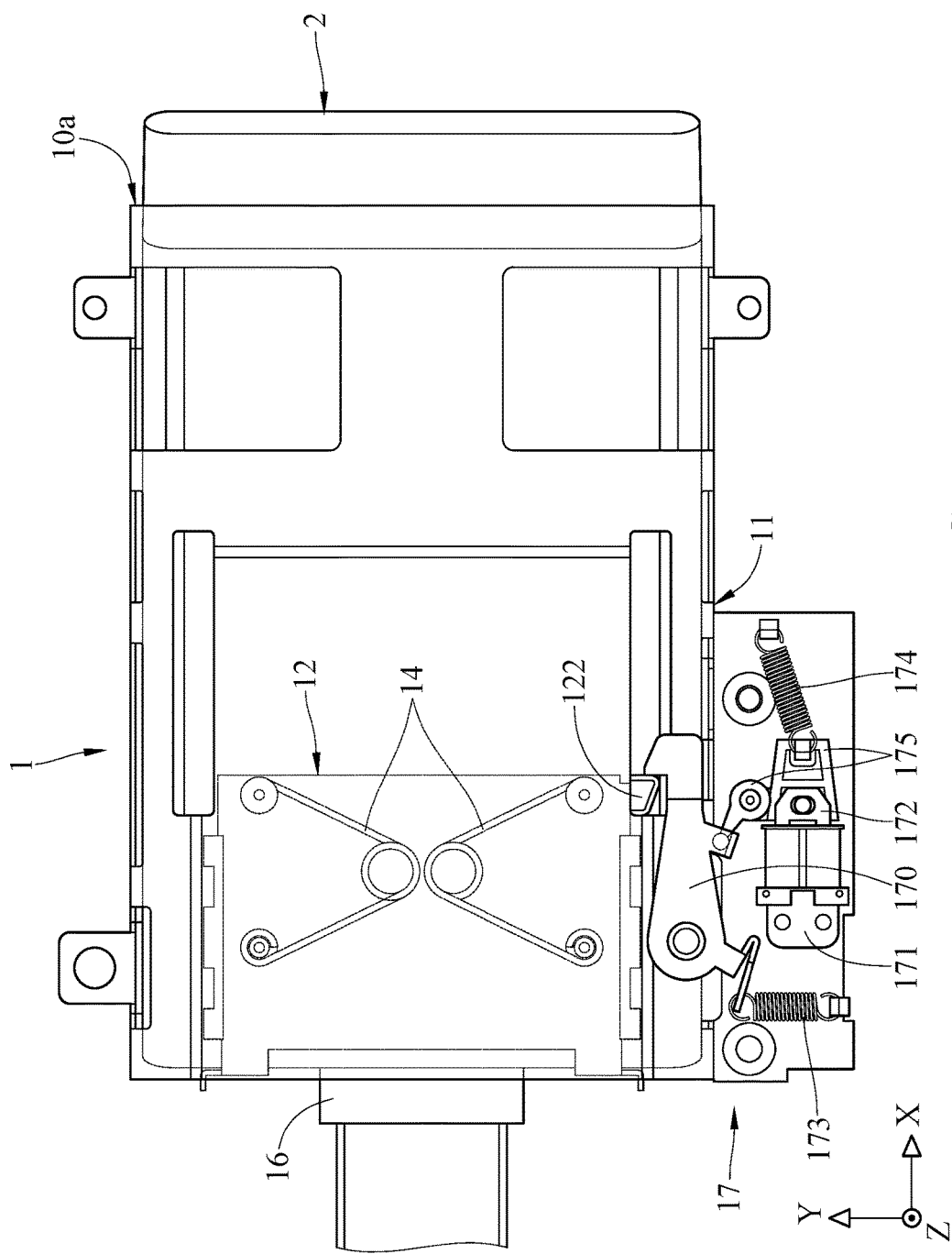
FIG. 5 is a top view of the slot assembly and the workpiece in FIG. 1 in another state.
Figure 6:
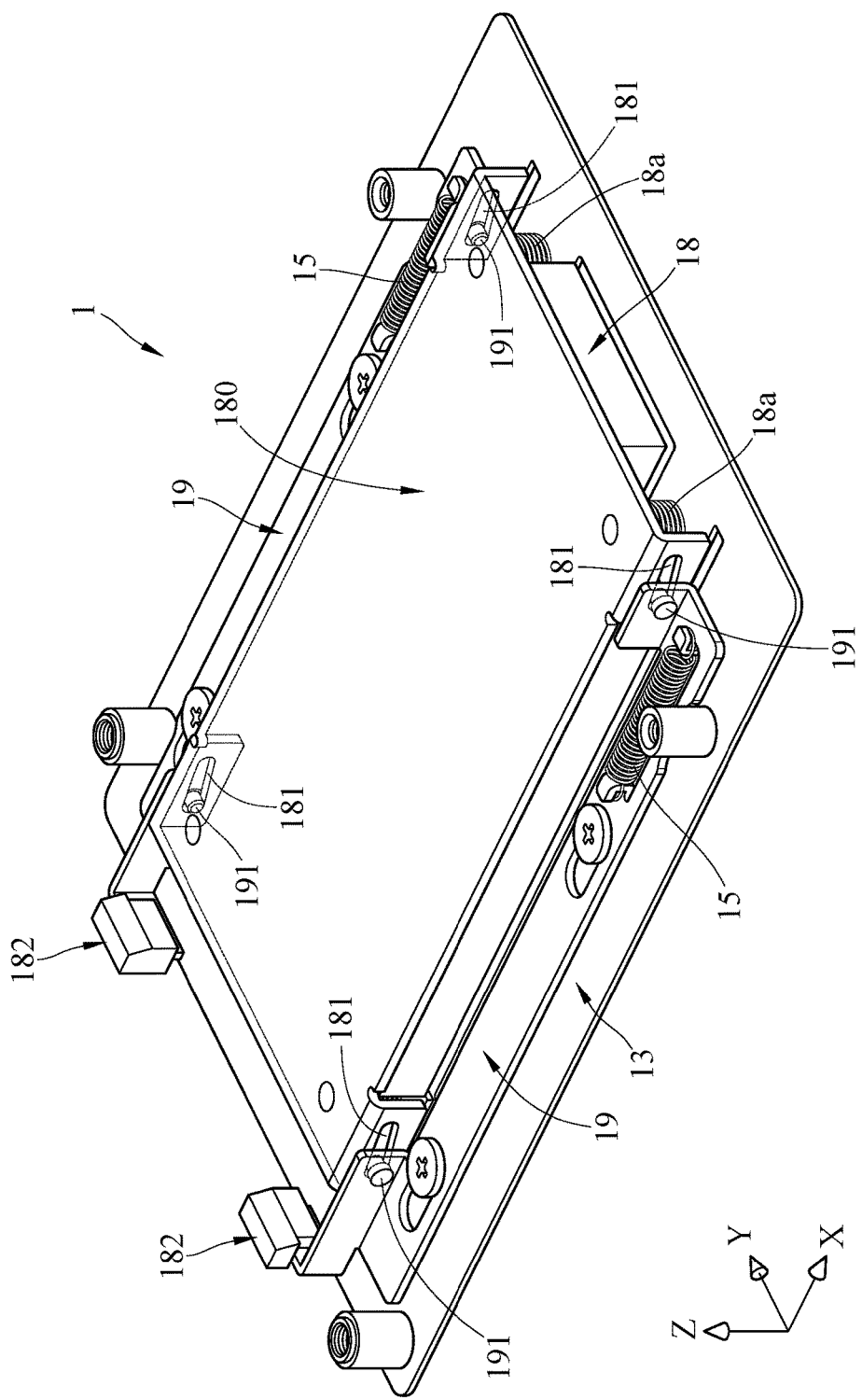
FIG. 6 is a perspective view of the slot assembly in FIG. 1 in the another state.
Figure 7:
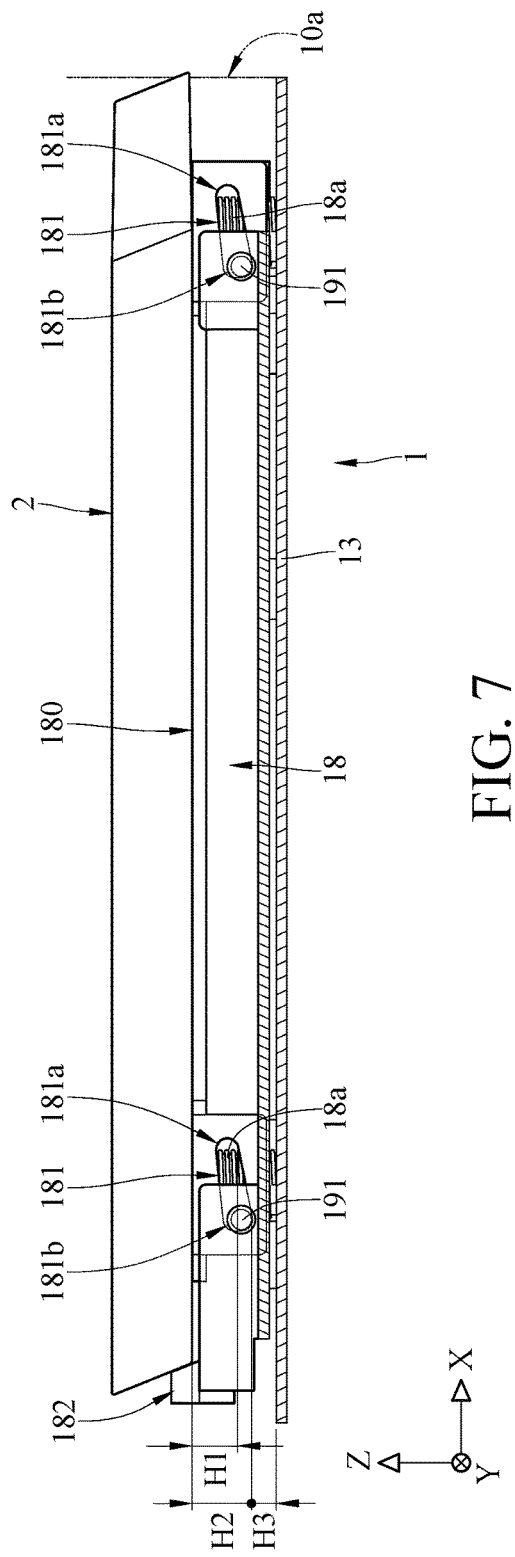
FIG. 7 is a cross-sectional side view of the slot assembly and the workpiece in FIG. 1 in the another state.

Please refer to FIG. 5, FIG. 6 and FIG. 7. When the workpiece 2 is kept being pushed into the accommodating space 10 to the inserted position, and pushes the push members 182 to the pressed position, the workpiece 2 and the connection port 16 are electrically connected, and the heat spreader 18 is at the thermal contact position and in thermal contact with the workpiece 2. The elastic members 15 are stretched and deformed.

At this moment, the workpiece 2 keeps pressing the tray 12, so that the elastic members 14 connected to the tray 12 and the holder body 11 are pressed and deformed. Furthermore, when the push members 182 are moved from the released position to the pressed position, the guide blocks 191 of the guide structures 19 is moved from the first end 181a of the guide elements 181 toward the second end 181b by being driven by the push members 182. At this moment, the distance between the thermal contact surface 180 of the heat spreader 18 and the substrate 13 equals to the distance H2 between the thermal contact surface 180 and the second end 181b plus the distance H3 between the guide blocks 191 and the substrate 13. Since the distance H2 between the thermal contact surface 180 and the second end 181b is greater than the distance H1 between the thermal contact surface 180 and the first end 181a, the thermal contact surface 180 is relatively away from the substrate 13, so that the heat spreader 18 is at the thermal contact position and relatively close to the workpiece 2.

In addition, when the first engaging portion 122 of the tray 12 passes through the second engaging portion 170 of the switch assembly 17; that is, when the second engaging portion 170 is located between the open end 10a and the first engaging portion 122, the first magnetic member 171 and the second magnetic member 172 are still attracting to each other so as to resist the elastic force of the second elastic member 174. Furthermore, the first elastic member 173 drives the second engaging portion 170 to rotate in the first rotation direction D1 again until the second engaging portion 170 presses against the pivotal member 175. The first engaging portion 122 and the second engaging portion 170 are again engaged with each other, so that the second engaging portion 170 is maintained at the turn-off position, and the first engaging portion 122 and the second engaging portion 170 are engaged with each other. At this moment, when an user lets go of the workpiece 2, the tray 12 is still at the inserted position, and the heat spreader 18 is still at the thermal contact position by the engagement between the first engaging portion 122 and the second engaging portion 170.

Figure 8:
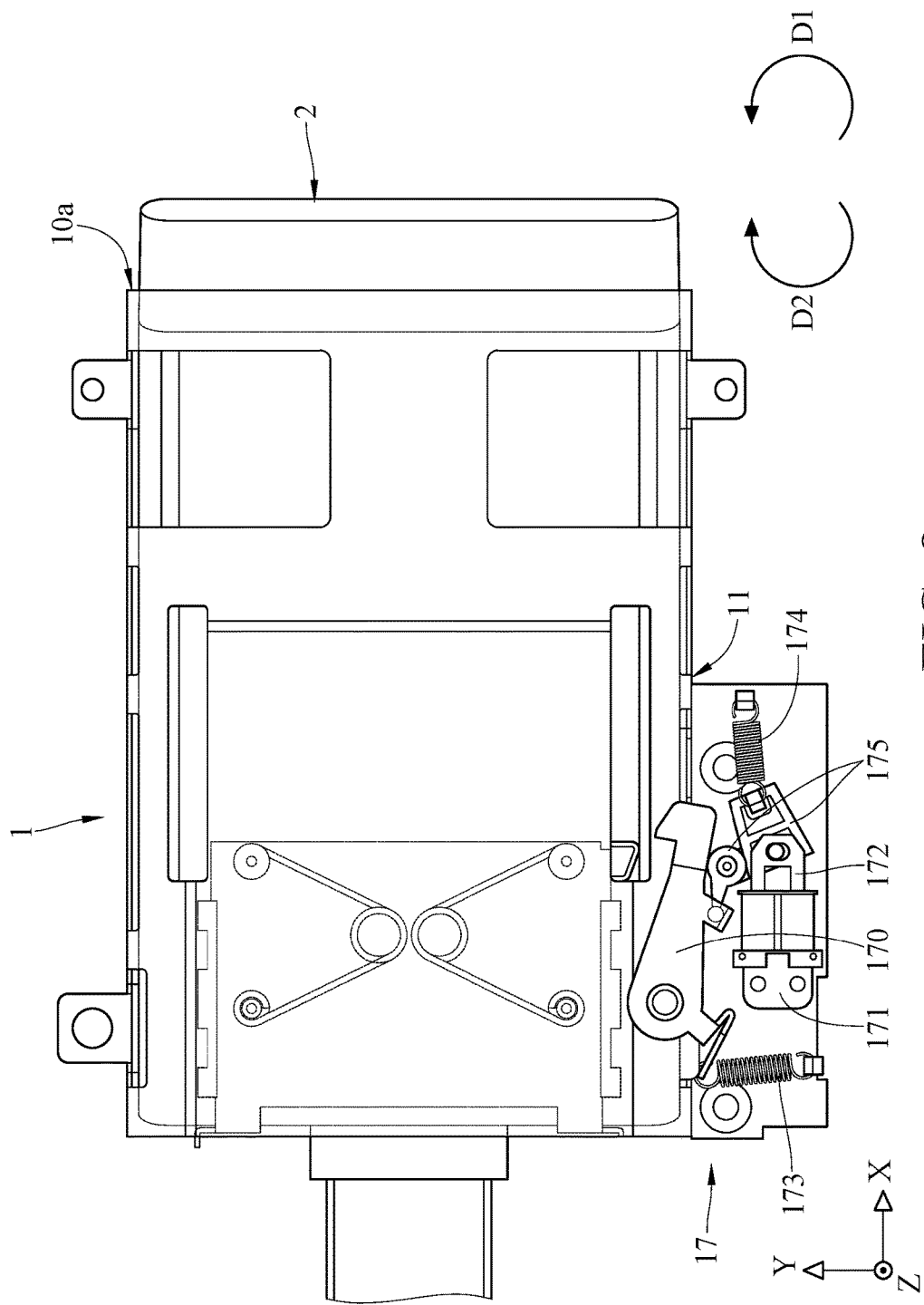
FIG. 8 and FIG. 9 show top views of the slot assembly and the workpiece in FIG. 1 when the slot assembly is switching positions.
Figure 9:
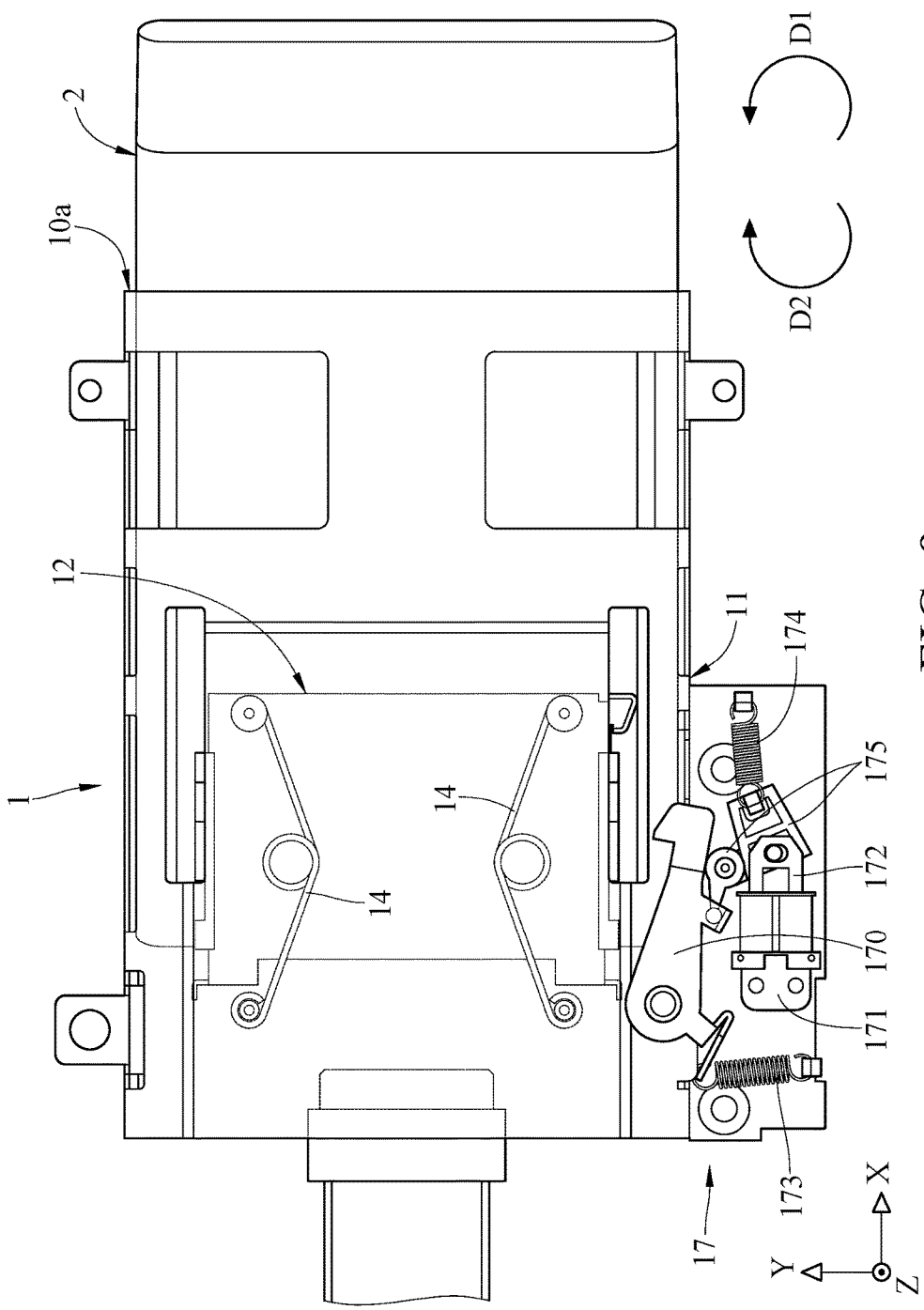

Please refer to FIG. 8 and FIG. 9. As shown in FIG. 8, when the workpiece 2 is being removed from the holder body 11, the magnetic attraction force between the first magnetic member 171 and the second magnetic member 172 is removed. At this moment, an elastic restoring force of the second elastic member 174 drives the pivotal member 175 to rotate in the first rotation direction D1. The pivotal member 175 presses against the second engaging portion 170. The second engaging portion 170 is rotated to the turn-on position in the second rotation direction D2 by being driven by the pushing force of the pivotal member 175 and an elastic restoring force of the first elastic member 173. At this moment, the second engaging portion 170 and the first engaging portion 122 are not engaged with each other. In addition, the elastic members 14 between the tray 12 and the holder body 11 provide an elastic restoring force to drive the tray 12 to move toward the open end 10a to the removed position, as shown in FIG. 9. The tray 12 drives the workpiece 2 to move away and disconnected from the connection port 16. The workpiece 2 is able to be removed from the slot assembly 1. Furthermore, at this moment, since the push members 182 are not pressed by the workpiece 2, the push members 182 is able to be moved toward the released position by the elastic restoring force of the elastic members 15.

Figure 11:
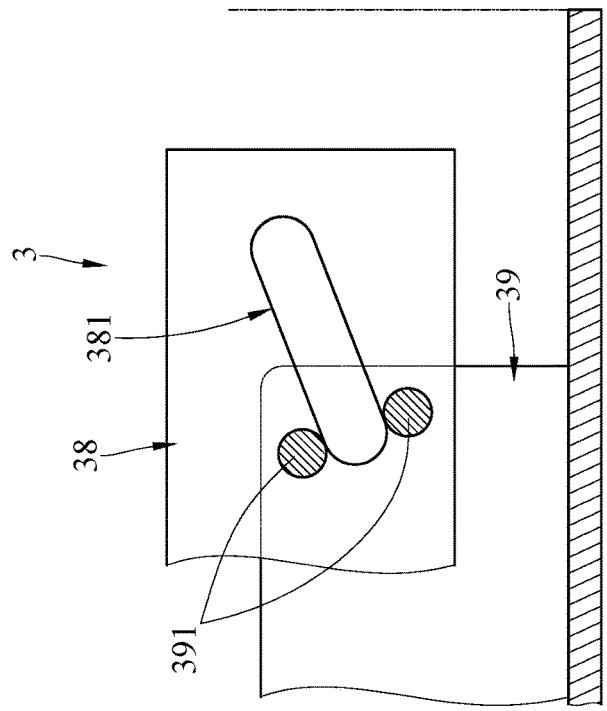
FIG. 11 is a cross-sectional side view of the part of the slot assembly in FIG. 10 in another state.
Figure 10:
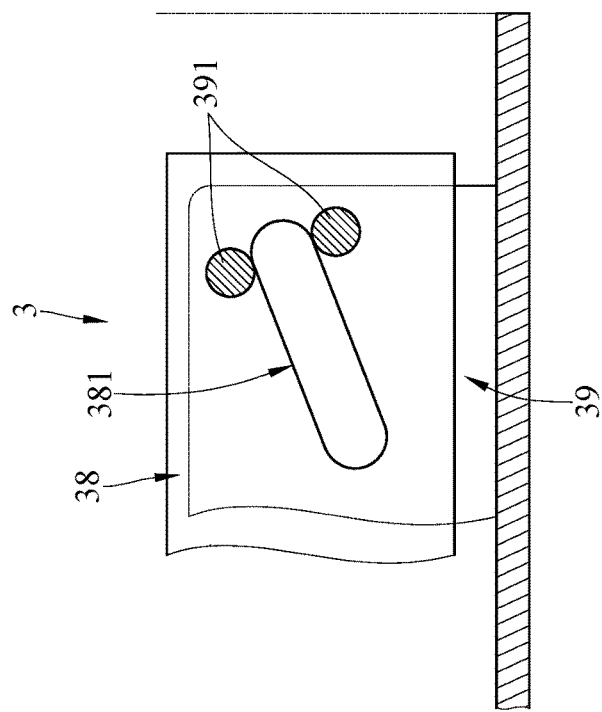
FIG. 10 is a cross-sectional side view of a part of a slot assembly in one state in accordance with another embodiment of the disclosure.

Please refer to FIG. 10 and FIG. 11. In this embodiment, a slot assembly 3 is provided. The slot assembly 3 is similar to the slot assembly 1 in FIG. 2, and the differences therebetween are that each of the guide elements 381 of the heat spreader 38 is in a rib-like shape. The guide structures 39 include the guide blocks 391. Each guide element 381 is movably located between the two guide blocks 391. As shown in FIG. 10, the heat spreader 38 is at the offset position. As shown in FIG. 11, the heat spreader 38 is at the thermal contact position.

Please refer to FIG. 12, FIG. 13, FIG. 14 and FIG. 15. In this embodiment, a slot assembly 4 is provided. The slot assembly 4 is similar to the slot assembly 1 in FIG. 2, and the differences therebetween are that the two the guide structures 49 are fixed on the substrate 43. The two push members 482 are fixed on the heat spreader 48. The heat spreader 48 is movably disposed on the guide structures 49. The push members 482 and the heat spreader 48 are movably disposed on the substrate 43 through the guide structures 49. One end of each of the two elastic members 45 is disposed on the substrate 43, and the other end of each of the two elastic members 45 is disposed on the heat spreader 48. The elastic members 45 are disposed on the push members 482 through the heat spreader 48. The elastic members 45 constantly force the push members 482 toward the released position. The heat spreader 48 has four guide elements 481. Each guide structure 49 includes two guide blocks 491 movable substantially along the guide elements 481. Each guide element 481 has a first end 481a close to the open end 40a and a second end 481b away from the open end 40a. A distance H4 between the first end 481a and the thermal contact surface 480 is greater than a distance H5 between the second end 481b and the thermal contact surface 480. A distance H6 between each guide block 491 and the substrate 43 does not vary.

Figure 12:
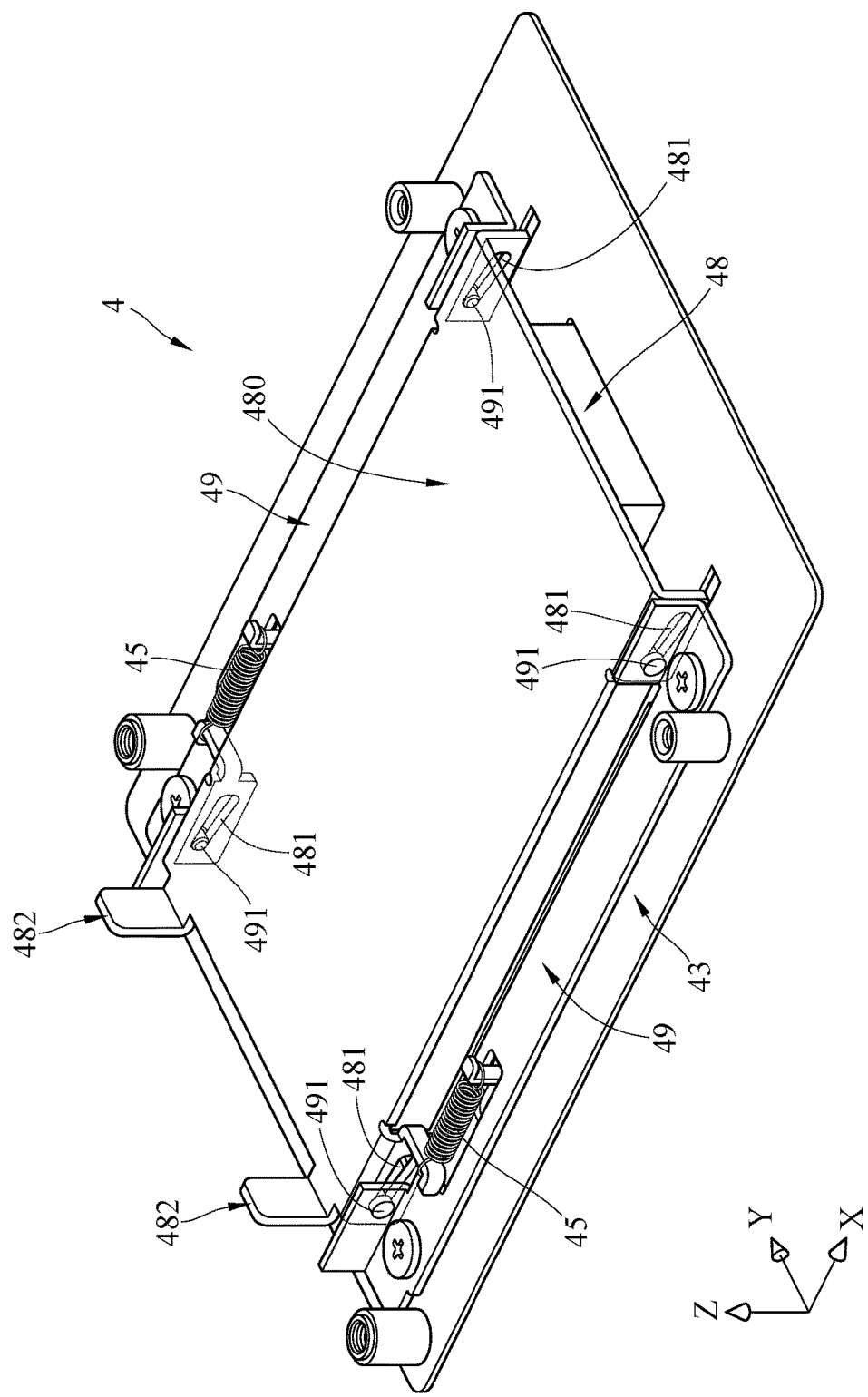
FIG. 12 is a perspective view of a part of a slot assembly in one state in accordance with yet another embodiment of the disclosure.
Figure 13:
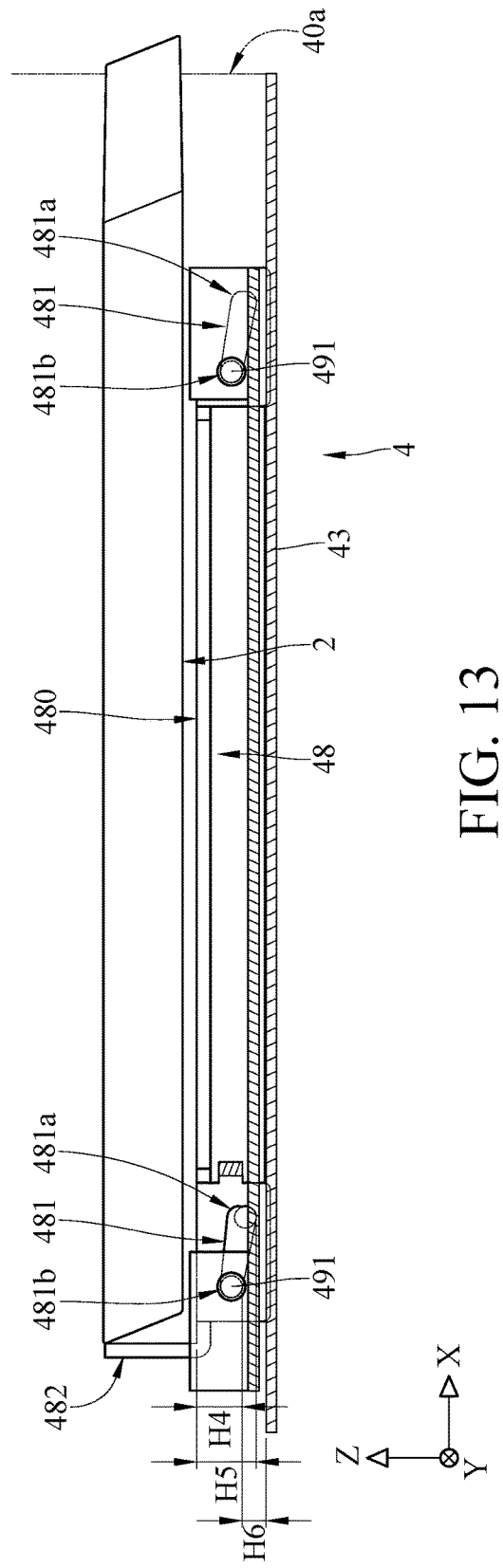
FIG. 13 is a cross-sectional side view of the part of the slot assembly and the workpiece in FIG. 12 in the one state.

As shown in FIG. 12 and FIG. 13, when the push members 482 are at the released position, the guide blocks 491 are at the second end 481b. At this moment, the distance between the thermal contact surface 480 of the heat spreader 48 and the substrate 43 equals to the distance H5 between the thermal contact surface 480 and the second end 481b plus the distance H6 between the guide blocks 491 and the substrate 43. Since the distance H5 between the thermal contact surface 480 and the second end 481b is less than the distance H4 between the thermal contact surface 480 and the first end 481a, the thermal contact surface 480 is relatively close to the substrate 43, so that the heat spreader 48 is located at the offset position. At this moment, the workpiece 2 and the heat spreader 48 are not in contact with each other; that is, the workpiece 2 and the heat spreader 48 are not pressing or sliding against each other.

Figure 14:
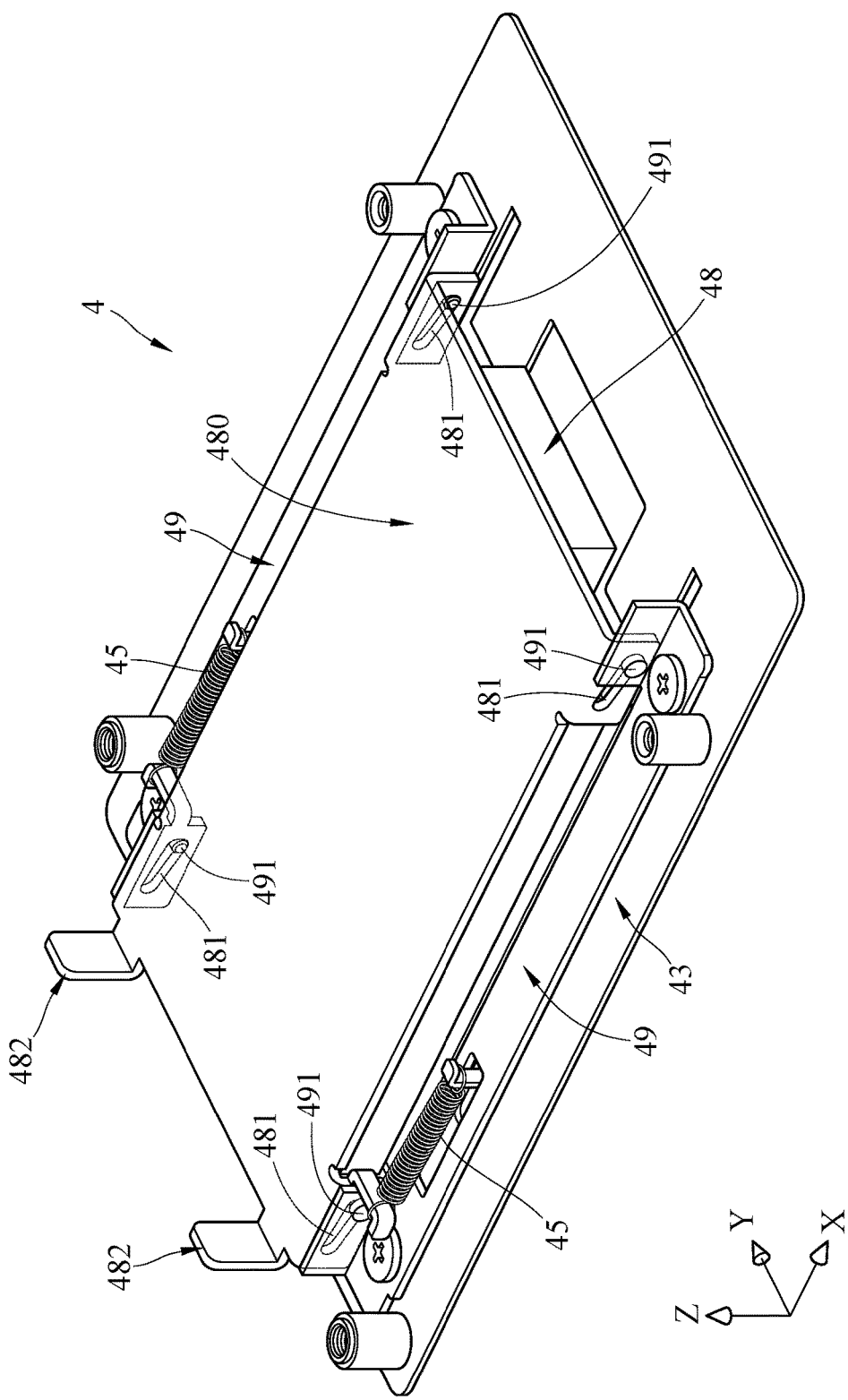
FIG. 14 is a perspective view of the part of the slot assembly in FIG. 12 in another state.
Figure 15:
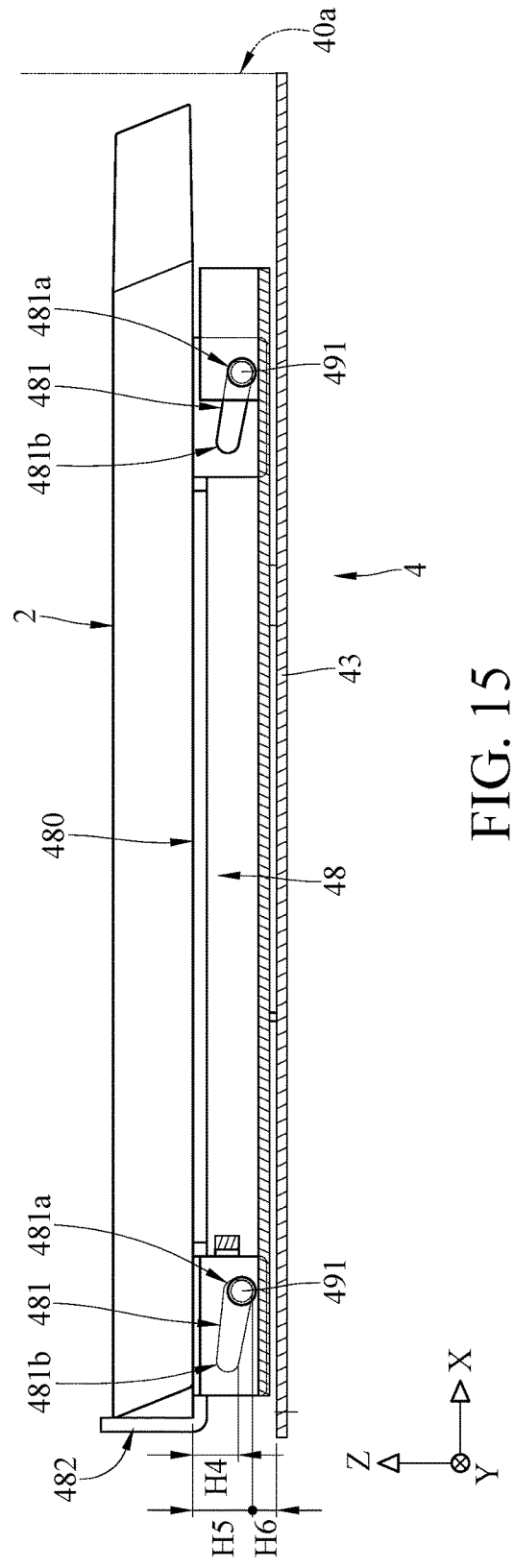
FIG. 15 is a cross-sectional side view of the part of the slot assembly and the workpiece in FIG. 13 in the another state.

As shown in FIG. 14 and FIG. 15, when the push members 482 are moved from the released position to the pressed position, the guide blocks 491 are moved from the second end 481b toward the first end 481a, and the elastic members 45 are stretched and deformed. At this moment, the distance between the thermal contact surface 480 of the heat spreader 48 and the substrate 43 equals to the distance H4 between the thermal contact surface 480 and the first end 481a plus the distance H6 between the guide blocks 491 and the substrate 43. Since the distance H4 between the thermal contact surface 480 and the first end 481a is greater than the distance H5 between the thermal contact surface 480 and the second end 481b, the thermal contact surface 480 is relatively away from the substrate 43, so that the heat spreader 48 is at the thermal contact position and relatively close to the workpiece 2. By the elastic restoring force of the elastic members 45, the push members 482 are moved toward the released position, and the heat spreader 48 is moved toward the offset position.

Figure 17:
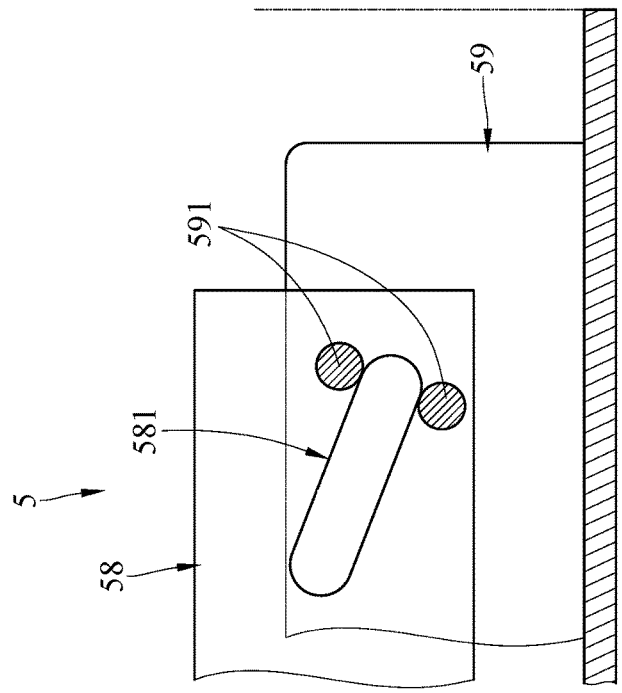
FIG. 17 is a cross-sectional side view of the part of the slot assembly in FIG. 16 in another state.
Figure 16:
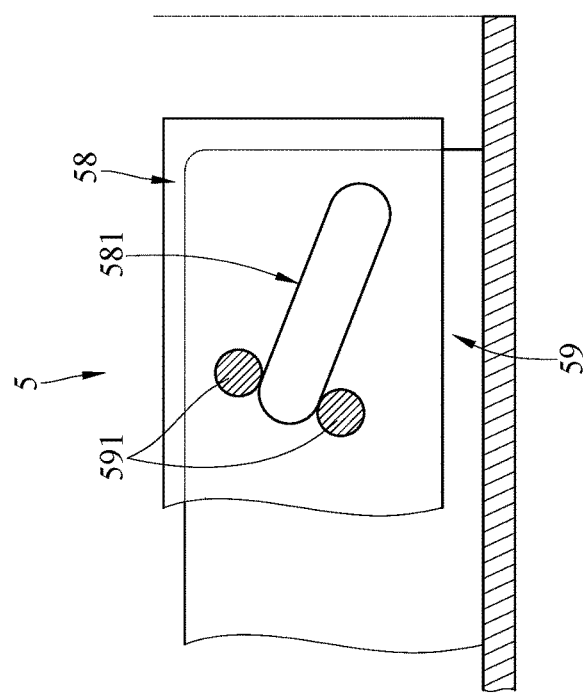
FIG. 16 is a cross-sectional side view of a part of a slot assembly in one state in accordance with still another embodiment of the disclosure.

Please refer to FIG. 16 and FIG. 17. In this embodiment, a slot assembly 5 is provided. The slot assembly 5 is similar to the slot assembly 4 in FIG. 13, and the differences therebetween are that each of the guide elements 581 of the heat spreader 58 is in a rib-like shape, and the guide structures 59 include the guide blocks 591. Each guide element 581 is movably located between the two guide blocks 591. As shown in FIG. 16, the heat spreader 58 is at the offset position. As shown in FIG. 17, the heat spreader 58 is at thermal contact position.

Figure 19:
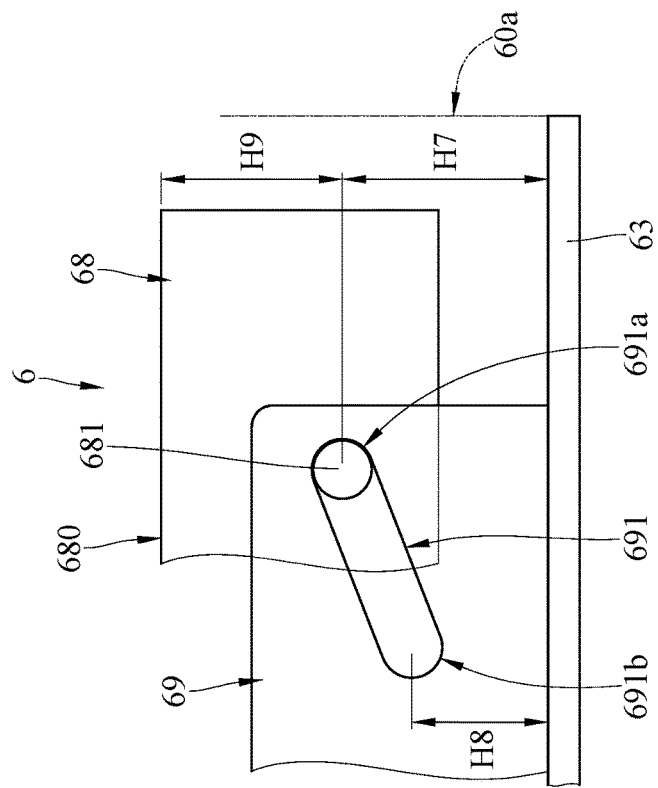
FIG. 19 is a side view of the part of the slot assembly in FIG. 18 in another state.
Figure 18:
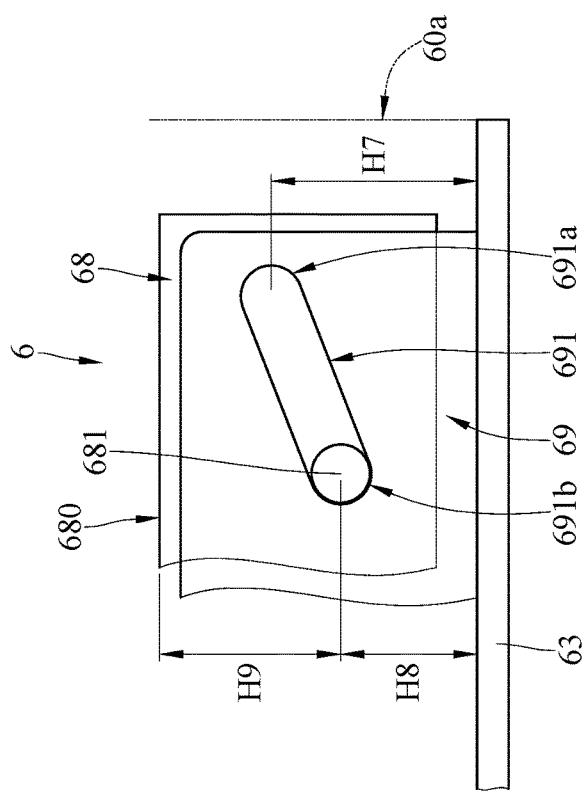
FIG. 18 is a side view of part of a slot assembly in one state in accordance with still yet another embodiment of the disclosure.

Please refer to FIG. 18 and FIG. 19. In this embodiment, a slot assembly 6 is provided. The slot assembly 6 is similar to the slot assembly 1 in FIG. 2, and the differences therebetween are that the guide structures 69 have the guide elements 691 which are grooves, and the heat spreader 68 includes the guide blocks 681 movable substantially along the guide elements 691. Each guide element 691 has a first end 691a close to the open end 60a and a second end 691b away from the open end 60a. A distance H7 between the first end 691a and the substrate 63 is greater than a distance H8 between the second end 691b and the substrate 63. A distance H9 between each guide block 681 and the thermal contact surface 680 does not vary.

As shown in FIG. 18, when the push members fixed to the guide structures 69 are at the released position, each guide block 681 is at the second end 691b of each guide element 691. At this moment, the distance between the thermal contact surface 680 of the heat spreader 68 and the substrate 63 equals to the distance H9 between the thermal contact surface 680 and the guide block 681 plus the distance H8 between the second end 691b and the substrate 63. Since the distance H8 between the second end 691b and the substrate 63 is less than the distance H7 between the first end 691a and the substrate 63, the thermal contact surface 680 is relatively close to the substrate 63, so that the heat spreader 68 is at the offset position. At this moment, the workpiece and the heat spreader 68 are not in contact with each other; that is, the workpiece and the heat spreader 68 are not pressing or sliding against each other.

As shown in FIG. 19, when the fixed push member of the guide structure 69 is moved from the released position to the pressed position, each guide block 681 is at the first end 691a of each guide element 691. At this moment, the distance between the thermal contact surface 680 of the heat spreader 68 and the substrate 63 equals to the distance H9 between the thermal contact surface 680 and the guide blocks 681 plus the distance H7 between the first end 691a and the substrate 63. Since the distance H7 between the first end 691a and the substrate 63 is greater than the distance H8 between the second end 691b and the substrate 63, the thermal contact surface 680 is relatively away from the substrate 63, so that the heat spreader 68 is at the thermal contact position relatively close to the workpiece.

Figure 21:
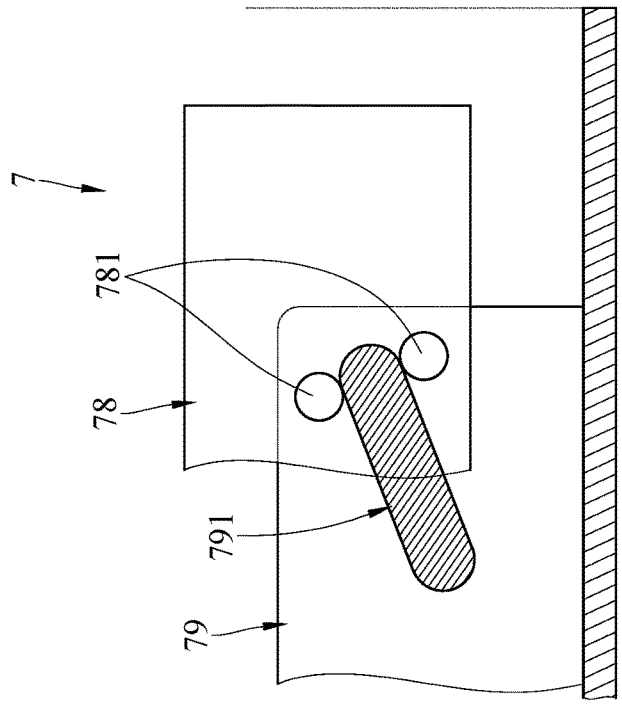
FIG. 21 is a cross-sectional side view of the part of the slot assembly in FIG. 20 in another state.
Figure 20:
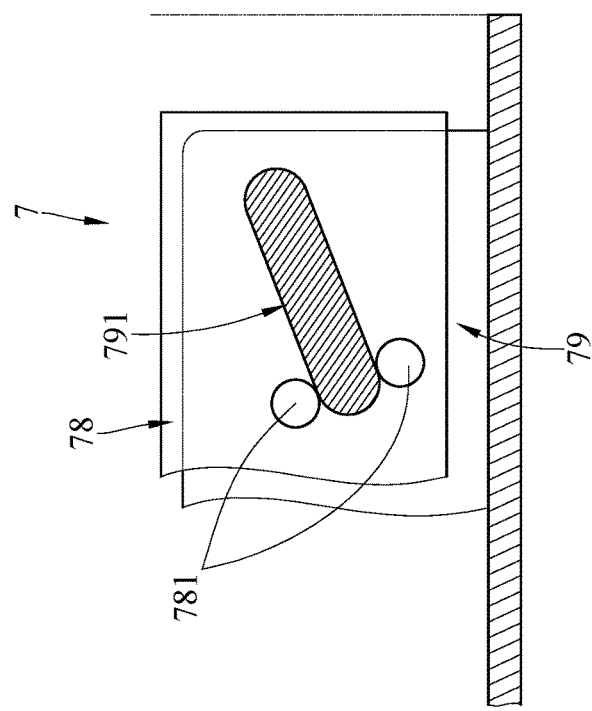
FIG. 20 is a cross-sectional side view of a part of a slot assembly in one state in accordance with yet a further embodiment of the disclosure.

Please refer to FIG. 20 and FIG. 21. In this embodiment, a slot assembly 7 is provided. The slot assembly 7 is similar to the slot assembly 6 in FIG. 18, and the differences therebetween are that the guide elements 791 of the guide structures 79 are in a rib-like shape. The heat spreader 78 includes the guide blocks 781. Each guide element 791 is movably located between two guide blocks 781. As shown in FIG. 20, the heat spreader 78 is at the offset position. As shown in FIG. 21, heat spreader 78 is at the thermal contact position.

Figures 22, 23:
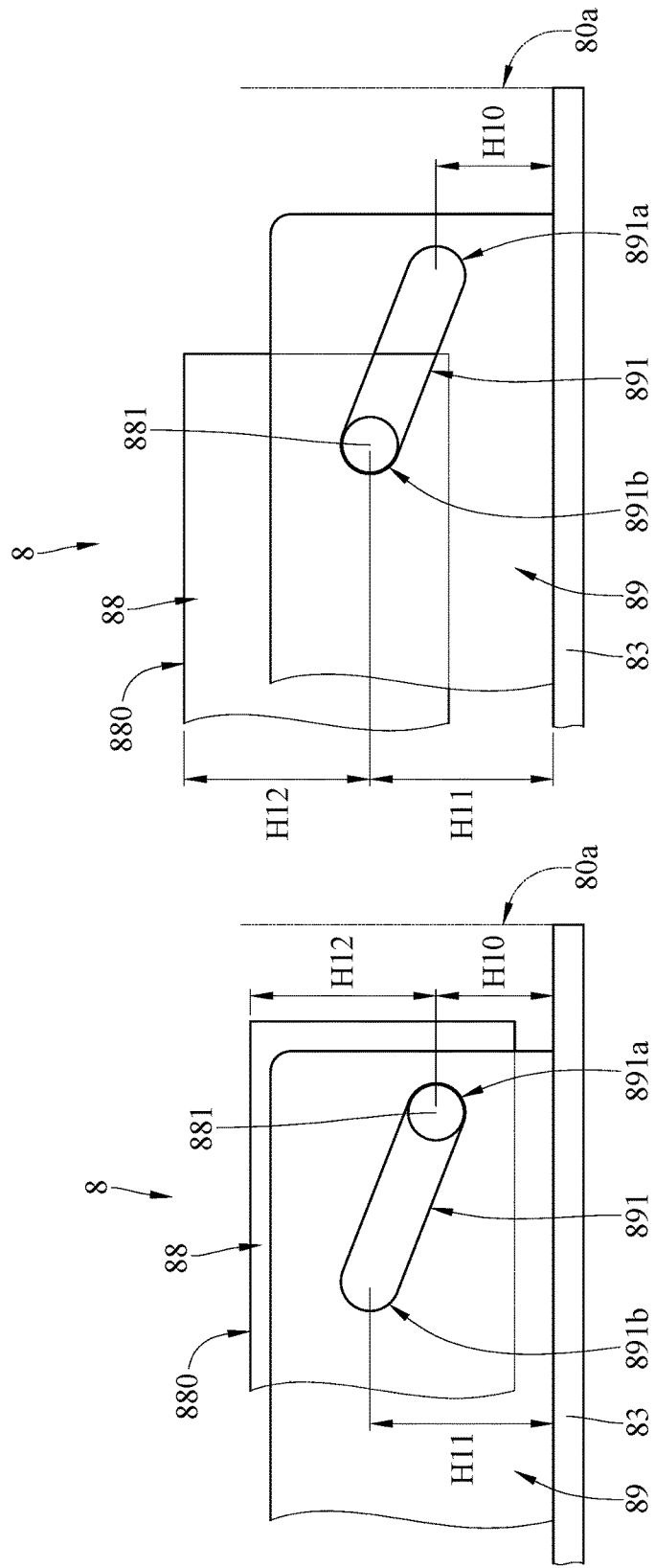
FIG. 22 is a side view of a part of a slot assembly in one state in accordance with still yet a further embodiment of the disclosure.
FIG. 23 is a side view of the part of the slot assembly in FIG. 22 in another state.

Please refer to FIG. 22 and FIG. 23. FIG. 22 is a side view of a part of a slot assembly in one state in accordance with still yet a further embodiment of the disclosure. FIG. 23 is a side view of the part of the slot assembly in FIG. 22 in another state.

In this embodiment, a slot assembly 8 is provided. The slot assembly 8 is similar to the slot assembly 4 in FIG. 12, and the differences therebetween are that each guide structure 89 has guide elements 891 which are grooves. The heat spreader 88 includes the guide blocks 881 movable substantially along the guide elements 891. Each guide element 891 has a first end 891a close to the open end 80a and a second end 891b away from the open end 80a. A distance H10 between the first end 891a and the substrate 83 is less than a distance H11 between the second end 891b and the substrate 83. A distance H12 between each guide block 881 and the thermal contact surface 880 does not vary.

As shown in FIG. 22, when the fixed push member of the heat spreader 88 is at the released position, the guide blocks 881 are at the first end 891a of the guide elements 891. At this moment, the distance between the thermal contact surface 880 of the heat spreader 88 and the substrate 83 equals to the distance H12 between the thermal contact surface 880 and the guide blocks 881 plus the distance H10 between the first end 891a and the substrate 83. Since the distance H10 between the first end 891a and the substrate 83 is less than the distance H11 between the second end 891b and the substrate 83, the thermal contact surface 880 is relatively close to the substrate 83, so that the heat spreader 88 is at the offset position. At this moment, the workpiece and the heat spreader 88 are not in contact with each other; that is, the workpiece and the heat spreader 88 are not pressing or sliding against each other.

As shown in FIG. 23, when the fixed push member of the heat spreader 88 is moved from the released position to the pressed position, the guide blocks 881 are moved to the second end 891b of the guide elements 891. At this moment, the distance between the thermal contact surface 880 of the heat spreader 88 and the substrate 83 equals to the distance H12 between the thermal contact surface 880 and the guide blocks 881 plus the distance H11 between the second end 891b and the substrate 83. Since the distance H11 between the second end 891b and the substrate 83 is greater than the distance H10 between the first end 891a and 83 substrate, the thermal contact surface 880 is relatively away from the substrate 83, so that the heat spreader 88 is at the thermal contact position relatively close to the workpiece.

Figure 25:
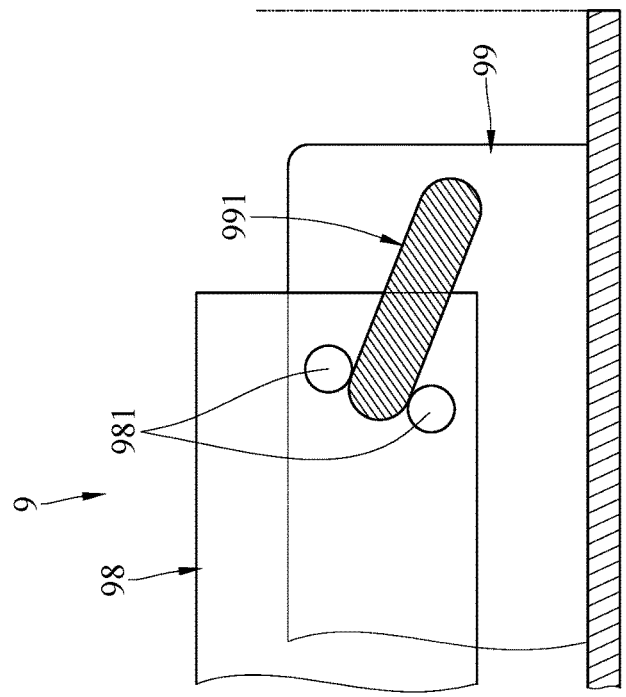
FIG. 25 is a cross-sectional side view of the part of the slot assembly in FIG. 24 in another state.
Figure 24:
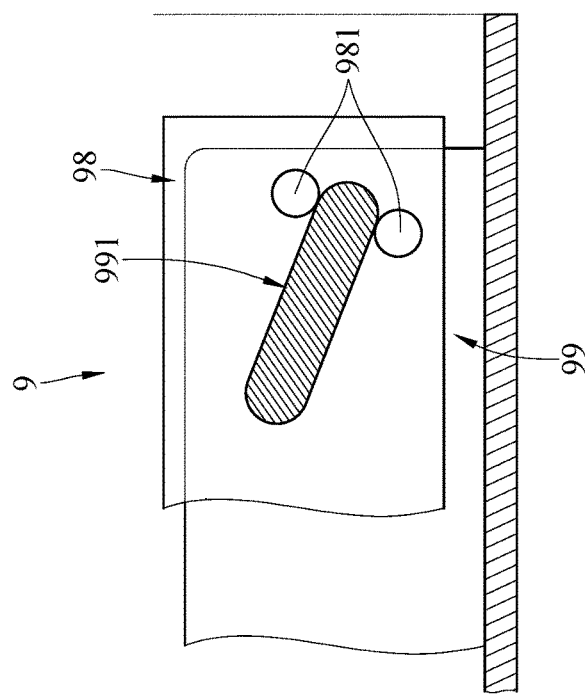
FIG. 24 is a cross-sectional side view of a slot assembly in one state in accordance with still yet another embodiment of the disclosure.

Please refer to FIG. 24 and FIG. 25. In this embodiment, a slot assembly 9 is provided. The slot assembly 9 is similar to the slot assembly 8 in FIG. 22, and the differences therebetween are that the guide elements 991 of the guide structures 99 are in a rib-like shape. The heat spreader 98 includes the guide blocks 981. Each guide element 991 is movably located between the two guide blocks 981. As shown in FIG. 24, the heat spreader 98 is at the offset position. As shown in FIG. 25, the heat spreader 98 is at the thermal contact position.

Figure 26:
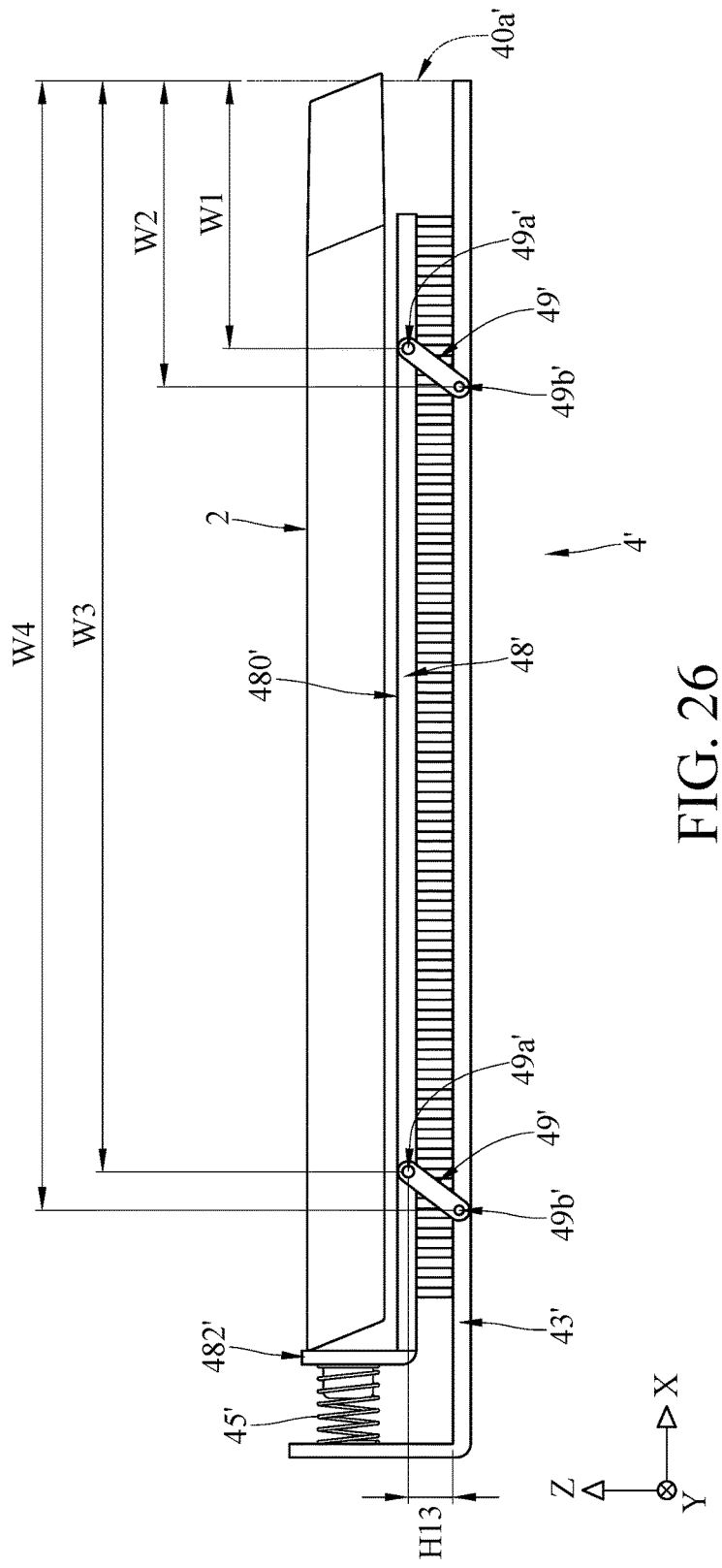
FIG. 26 is a side view of a part of a slot assembly and a workpiece in one state in accordance with yet a further embodiment of the disclosure.
Figure 27:
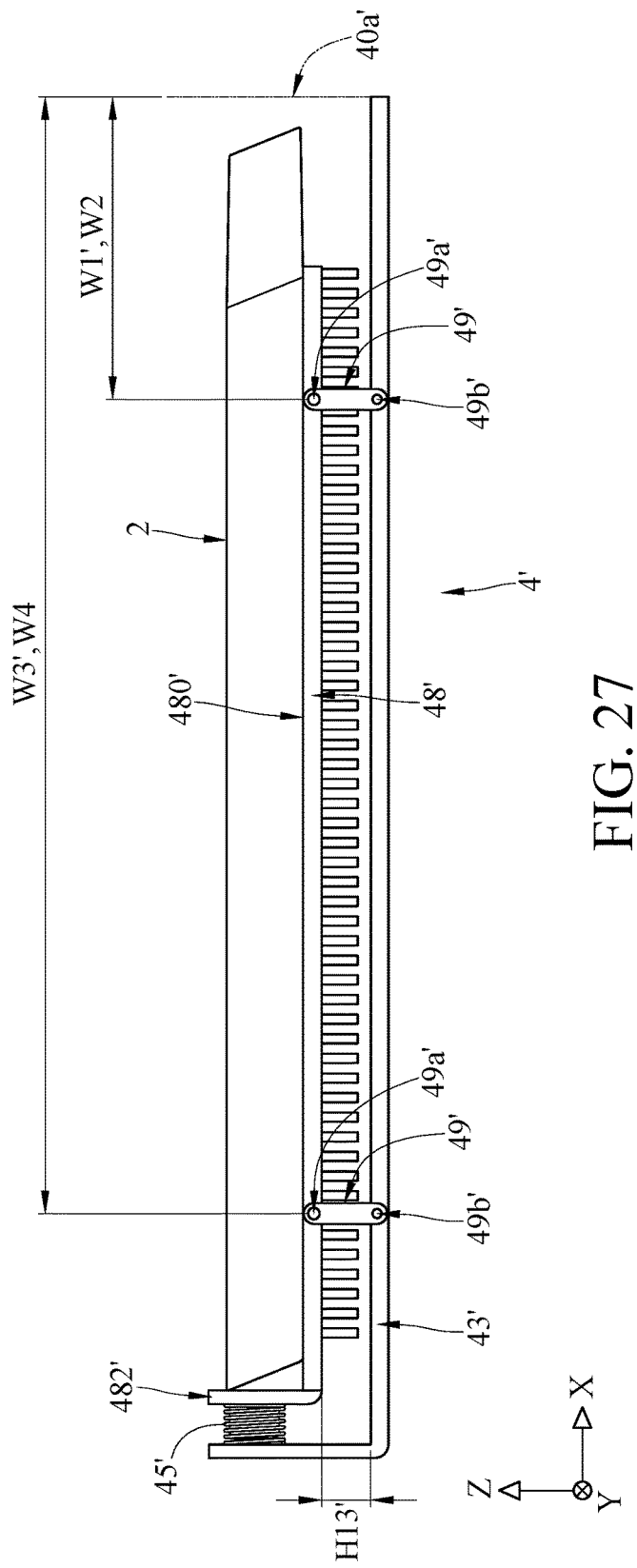
FIG. 27 is a side view of the part of the slot assembly and the workpiece in FIG. 26 in another state.

Please refer to FIG. 26 and FIG. 27. In this embodiment, a slot assembly 4' is provided. The slot assembly 4' is similar to the slot assembly 4 in FIG. 12, and the differences therebetween are that the slot assembly 4' includes four guide structures 49', wherein two of the guide structures 49' and the other two of the guide structures 49' are respectively located at the opposite sides of the heat spreader 48'. Since two of the guide structures 49' and the other two of the guide structures 49' are overlapped in figures, two of the guide structures 49' are used for illustration. Each guide structure 49' is pivoted at the substrate 43' and the heat spreader 48'. The two guide structures 49', the substrate 43' and the heat spreader 48' form a four-bar linkage mechanism. The push members 482' are fixed on the heat spreader 48'. One end of each elastic member 45' is disposed on the substrate 43', the other end of each elastic member 45' is disposed on each push member 482'. The elastic members 45' constantly force the push members 482' toward the released position.

As shown in FIG. 26, the heat spreader 48' is at the offset position, and the guide structures 49' are inclined toward the direction of the open end 40a' and the substrate 43'. The guide structures 49' are respectively pivoted at the heat spreader 48' at the positions 49a' and the substrate 43' at the positions 49b'. A distance W1 from the position 49a' on the right-hand side of FIG. 26 to the open end 40a' and a distance W3 from the position 49a' on the left-hand side of FIG. 26 to the open end 40a' are respectively less than a distance W2 from the position 49b' on the right-hand side of FIG. 26 to the open end 40a' and a distance W4 from the position 49b' on the left-hand side of FIG. 26 to the open end 40a'. Furthermore, the distance W1 and the distance W3 respectively from the positions 49a' in FIG. 26 to the open end 40a' are relatively small, and a distance H13 from each position 49a' in FIG. 26 to the substrate 43' is relatively small, and the distance between the thermal contact surface 480' and the workpiece 2 is relatively large.

As shown in FIG. 27, the heat spreader 48' is in thermal contact with the workpiece 2 at the thermal contact position, and the guide structures 49' are relatively straight up and down on the substrate 43'. The guide structures 49' are respectively pivoted at the heat spreader 48' at the positions 49a' and the substrate 43' at the positions 49b'. The distance W1 from the position 49a' on the right-hand side of FIG. 26 to the open end 40a' and the distance W3 from the position 49a' on the left-hand side of FIG. 26 to the open end 40a' are respectively substantially equal to the distance W2 from the position 49b' on the right-hand side of FIG. 26 to the open end 40a' and the distance W4 from the position 49b' on the left-hand side of FIG. 26 to the open end 40a'. Furthermore, the distance W1 and the distance W3 respectively from the positions 49a' in FIG. 26 to the open end 40a' are relatively large, and the distance H13 from each position 49a' in FIG. 26 to the substrate 43' is relatively large, and the distance between the thermal contact surface 480' and the workpiece 2 is relatively small. Furthermore, the elastic members 45' are pressed and deformed. When the workpiece 2 is removed, the push members 482' are moved to the released position by the elastic restoring force of the elastic members 45', so that the heat spreader 48' is moved toward the offset position.

Various embodiments have been described herein. It should be appreciated, moreover, that the various features of the embodiments that have been described may be interchanged and combined in various ways to produce numerous additional embodiments. These embodiments are given only by way of example and are not intended to limit the scope of the disclosure.

As the slot assembly as discussed in above, when the workpiece is being inserted into the accommodating space but not in contact with the push member yet, the push members are at the released position, so that the heat spreader is at the offset position and relatively close to the substrate. Before the push members being pushed to the pressed position by the workpiece, the heat spreader is not moved to the thermal contact position to be in thermal contact with the workpiece, either, During the insertion of the workpiece, the workpiece is not in contact with the heat spreader, so that the friction between the heat spreader and the workpiece is prevented, thereby preventing the heat spreader and the workpiece to wear between them. The heat spreader is moved to the thermal contact position until the workpiece pushes the push member to the pressed position. At this moment, the workpiece is completely installed and fixed in place, and the heat spreader is in thermal contact with the workpiece so as to remove heat generated by the workpiece. When the workpiece is being removed, the heat spreader is moved toward the offset position, which is favorable for preventing the friction and the heat spreader and the workpiece to wear between them.

The embodiments were chosen and described in order to best explain the principles of the disclosure and its practical applications, to thereby enable others skilled in the art to best utilize the disclosure and various embodiments with various modifications as are suited to the particular use contemplated. It is intended that the scope of the disclosure be defined by the following claims and their equivalents.

What is claimed is:

1. A slot assembly configured for being inserted by a workpiece, comprising:
   a holder body;
   a substrate, the holder body disposed on the substrate, the substrate and the holder body together form an accommodating space therebetween, the accommodating space having an open end, the workpiece configured for being inserted into or removed from the accommodating space through the open end;
   a push member movably disposed on the substrate and located in the accommodating space, the push member being movable between a released position and a pressed position; when the push member is at the released position, the push member is relatively close to the open end relative to the substrate; when the push member is at the pressed position, the push member is relatively away from the open end relative to the substrate; the push member configured for being moved from the released position to the pressed position by being pushed by the workpiece; and
   a heat spreader movably disposed on the substrate and located in the accommodating space, the heat spreader having a thermal contact surface facing away from the substrate, the thermal contact surface configured for being in thermal contact with the workpiece, the push member disposed on the heat spreader; when the push member is located at the released position, the heat spreader is located at an offset position where the thermal contact surface is relatively close to the substrate; when the push member is located at the pressed position, the heat spreader is located at a thermal contact position where the thermal contact surface is relatively away from the substrate and is in thermal contact with the workpiece.

2. The slot assembly according to claim 1, further comprising a guide structure, the guide structure disposed on the substrate and movable substantially along a surface of the substrate, the push member fixed on the guide structure and movably disposed on the substrate through the guide structure, the heat spreader having a guide element, the guide structure comprising at least one guide block which is movable substantially along the guide element, the guide element having a first end relatively close to the open end and a second end relatively away from the open end, a distance between the first end and the thermal contact surface less than a distance between the second end and the thermal contact surface; when the push member is located at the released position, the at least one guide block is located at the first end, so that the thermal contact surface is relatively close to the substrate, and the heat spreader is located at the offset position; when the push member is moved from the released position to the pressed position, the at least one guide block is driven to move from the first end toward the second end, so that the thermal contact surface is relatively away from the substrate, and the heat spreader is located at the thermal contact position.

3. The slot assembly according to claim 1, further comprising a guide structure, the guide structure disposed on the substrate and movable substantially along a surface of the substrate, the push member fixed on the guide structure and movably disposed on the substrate through the guide structure, the guide structure having a guide element, the heat spreader comprising at least one guide block which is movable substantially along the guide element, the guide element having a first end relatively close to the open end and a second end relatively away from the open end, a distance between the first end and the substrate greater than a distance between the second end and the substrate; when the push member is located the released position, the at least one guide block is located at the second end, so that the heat spreader is relatively close to the substrate, and the heat spreader is located at the offset position; when the push member is moved from the released position to the pressed position, the at least one guide block is driven to move from the second end toward the first end, so that the heat spreader is relatively away from the substrate, and the heat spreader is located at the thermal contact position.

4. The slot assembly according to claim 1, further comprising a guide structure fixed at the substrate, the push member fixed on the heat spreader and movably disposed on the substrate through the heat spreader, the heat spreader having a guide element, the guide structure comprising at least one guide block movable substantially along the guide element, the guide element having a first end relatively close to the open end and a second end relatively away from the open end, a distance between the first end and the thermal contact surface is greater than a distance between the second end and the thermal contact surface; when the push member is located at the released position, the at least one guide block is located at the second end, so that the thermal contact surface is relatively close to the substrate, and the heat spreader is located at the offset position; when the push member is moved from the released position to the pressed position, the at least one guide block is driven to move from the second end toward the first end, so that the thermal contact surface is relatively away from the substrate, and the heat spreader is located at the thermal contact position.

5. The slot assembly according to claim 1, further comprising a guide structure fixed on the substrate, the push member fixed on the guide structure and movably disposed on the substrate through the guide structure, the guide structure having a guide element, the heat spreader comprising at least one guide block movable substantially along the guide element, the guide element having a first end relatively close to the open end and a second end relatively away from the open end, a distance between the first end and the substrate is less than a distance between the second end and the substrate; when the push member is located at the released position, the at least one guide block is located at the first end, so that the heat spreader is relatively close to the substrate, and the heat spreader is located at the offset position; when the push member is moved from the released position to the pressed position, the at least one guide block is driven to move from the first end toward the second end, so that the heat spreader is relatively away from the substrate, and the heat spreader is located at the thermal contact position.

6. The slot assembly according to claim 1, further comprising two guide structures, each of the two guide structures pivoted to the substrate and the heat spreader, the guide structures, the substrate and the heat spreader forming a four-bar linkage mechanism, the push member fixed on the heat spreader, a distance between a position where each guide structure is pivoted to the heat spreader and the open end is less than or equal to a distance between a position where each guide structure is pivoted to the substrate and the open end.

7. The slot assembly according to claim 1, further comprising an elastic member disposed on the push member and the substrate, and the elastic member constantly forcing the push member toward the released position.

8. The slot assembly according to claim 1, further comprising an elastic member disposed between the heat spreader and the substrate, and the elastic member constantly forcing the heat spreader toward the thermal contact position.

9. The slot assembly according to claim 1, further comprising a tray slidably disposed on the holder body and located in the accommodating space, the tray being movable among a removed position, an inserted position and a transition position; when the tray is at the removed position, the tray is relatively close to the open end relative to the holder body; when the tray is at the inserted position, the tray is relatively away from the open end relative to the holder body; when the tray is at the transition position, the tray is between the removed position and the inserted position; when the tray is at either the removed position or the transition position, the push member is at the released position, and the heat spreader is at the offset position; when the tray is at the inserted position, the push member is at the pressed position, and the heat spreader is at the thermal contact position.

10. The slot assembly according to claim 9, further comprising an elastic member, the holder body and the tray connected by the elastic member, and the elastic member constantly forcing the tray toward the removed position.

* * * * *